United States Patent
Oneppo et al.

(10) Patent No.: US 8,581,912 B2
(45) Date of Patent: Nov. 12, 2013

(54) DYNAMIC SUBROUTINE LINKAGE OPTIMIZING SHADER PERFORMANCE

(75) Inventors: Michael V. Oneppo, Seattle, WA (US); Craig Peeper, Bellevue, WA (US); Andrew L. Bliss, Kirkland, WA (US); John L. Rapp, Seattle, WA (US); Mark M. Lacey, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 802 days.

(21) Appl. No.: 12/163,734

(22) Filed: Jun. 27, 2008

(65) Prior Publication Data

US 2009/0322751 A1    Dec. 31, 2009

(51) Int. Cl.
*G06F 15/00* (2006.01)
*G06T 15/50* (2011.01)

(52) U.S. Cl.
USPC .......................................... 345/501; 345/426

(58) Field of Classification Search
None
See application file for complete search history.

(56) References Cited

U.S. PATENT DOCUMENTS

| | | | |
|---|---|---|---|
| 6,041,179 A | | 3/2000 | Bacon et al. |
| 6,507,946 B2 * | | 1/2003 | Alexander et al. ............ 717/145 |
| 6,654,951 B1 | | 11/2003 | Bacon et al. |
| 6,658,657 B1 * | | 12/2003 | Lueh .............................. 717/158 |
| 6,704,927 B1 | | 3/2004 | Bak et al. |
| 7,463,259 B1 * | | 12/2008 | Kolb et al. ..................... 345/426 |
| 7,523,406 B2 * | | 4/2009 | Cazabon et al. ............... 715/771 |
| 7,548,244 B2 * | | 6/2009 | Heirich ......................... 345/501 |
| 7,598,953 B2 * | | 10/2009 | Tarditi et al. .................. 345/440 |
| 7,750,913 B1 * | | 7/2010 | Parenteau et al. ............. 345/502 |
| 2004/0164987 A1 | | 8/2004 | Aronson et al. |
| 2004/0237074 A1 | | 11/2004 | Aronson et al. |
| 2006/0055695 A1 | | 3/2006 | Abdalla et al. |
| 2007/0091088 A1 | | 4/2007 | Jiao et al. |
| 2007/0091089 A1 * | | 4/2007 | Jiao et al. ...................... 345/426 |
| 2007/0153015 A1 | | 7/2007 | You-Ming |
| 2009/0085919 A1 * | | 4/2009 | Chen et al. .................... 345/520 |

OTHER PUBLICATIONS

Detlefs et al., Inlining of Virtual Methods, 1999, ECOOP'99, LNCS 1628, pp. 258-277.*
Peeper et al., Introduction to the DirectX 9 High Level Shading Language, Jul. 2003, MSDN Online Library, pp. 1-32.*

* cited by examiner

*Primary Examiner* — Daniel Hajnik
*Assistant Examiner* — Anh-Tuan V Nguyen
(74) *Attorney, Agent, or Firm* — Shook, Hardy & Bacon L.L.P.

(57) ABSTRACT

Allocation of memory registers for shaders by a processor is described herein. For each shader, registers are allocated based on the shader's level of complexity. Simpler shader instances are restricted to a smaller number of memory registers. More complex shader instances are allotted more registers. To do so, developers' high level shading level (HLSL) language includes template classes of shaders that can later be replaced by complex or simple versions of the shader. The HLSL is converted to bytecode that can be used to rasterize pixels on a computing device.

16 Claims, 3 Drawing Sheets

DYNAMIC SUBROUTINE LINKAGE OPTIMIZING SHADER PERFORMANCE

BACKGROUND

Today's graphic processing units (GPUs) host all of the computations necessary to generate high-quality graphics on computer screens, leaving a computing device's central processing unit (CPU) available for other tasks. Specifically, GPUs render graphics on computer screens by processing numerous programs called "shaders." In short, a shader is a specialized computer program that performs an operation for rendering a two-dimensional (2D) or three-dimensional (3D) graphic. In modern GPUs, realistic scenes are generated by rendering geometry with various virtual materials that are controlled by the shaders. These materials are represented in shader program code, which processes a variety of inputs (including texture maps, light locations, and other data) to generate the visual result. Using shaders, developers can control virtually any graphics or graphic effect by incorporating different vertex shading, primitive shading, and pixel shading.

The current methodology for rendering complex 3D graphic scenes in real time consists of supporting parallel-architecture processors in conjunction with customized logic units to hide latency by distributing the overhead across multiple parallel units. The pipelines utilized are designed around a primitive rasterization pipeline that, when provided a high level 3D description of a collection of linear primitives like points, line segments, or triangles, will convert, or rasterize, the collection to the projected pixel representations. In existing 3D hardware technologies, small programs called "shaders" are used to define the operation of certain stages of the rendering algorithm, like the transformations of the vertices of the primitives or computing the color of a single pixel on the screen. The shaders define a small amount of work to be performed in large parallel execution batches, often distributed across many specialized processors on a graphics processing unit (GPU).

Creation of shaders is done through a highly specialized programming language designed to target the hardware architectures available, and an equivalent compiler is available to take the code and reduce it down to instructions the hardware and associated device driver can use. Developers use this technology in order to customize the rendering pipeline to only the behavior desired for a specific application. For example, if the developer is creating an application that performs a non-photorealistic 3D rendering of very complex themes, the developer can optimize the shaders to be very simple in order to maximize the complexity of the scene. Conversely, if the developer wishes to have very high-fidelity material properties and lighting applied to less complex scenes, the developer may create highly-customized shaders to create very realistic effects that may be very complex. Furthermore, shaders are compiled into an abstract binary form, which a device driver maps for hardware to run.

To illustrate this point, consider a game scene in which a character is exposed to multiple light sources. One of the light sources may be simply ambient light from a moon at night. Another light source may be extending from a lamp post down a street. With the first light source, that being from the moon, a shader can be written to control the light emitting from the moon. In this case, the light is constant and only needs to be represented by a simple program to disperse the light throughout the scene. The lamp post, however, may be more complex. With the lamp post, the light may only be configured to shine in specific directions; however, the light from the lamp post may not bend around corners. Therefore, a shader written to govern the light from the lamp post may require a more complex computation than the shader written to govern the light coming from the moon. In either scenario, a GPU must rasterize pixels according to the underlying computations from each shader.

The common architecture for GPUs provide the trade-off between scene complexity and shader complexity by making resources on the system flexible. To execute, the shader typically requires a processing unit, shader-instanced data, global resources (e.g., texture images), intermediary register banks to perform computations, and a set of output registers. For simple shaders, meaning the shaders require relative few registers to compute, many more shaders can be run simultaneously, resulting in an underlying application or game getting higher frame rates because more work can be done in parallel. For more complex shaders, meaning the shaders require more registers to compute, fewer instances of the more complex shaders can be executed in parallel because more registers are being used. In other words, allocation of registers have a direct determination on the number of shaders that can be processed in parallel. Because the time required to render graphics depends on parallel processing of shaders, it is advantageous to process as many shaders as possible, and thus the allocation of registers is crucial to performance.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

One aspect of the invention allows a single shader to have alternate paths of varying complexity within it. In this aspect, a selection of a particular path through the shader is provided in a way that allows efficient register allocation. Memory registers are allocated based on the level of complexity of a shader path or instance. In one embodiment, shader instances are shader programs, or portions thereof, developed by shader developers. Simpler shader paths or instances may be restricted to a smaller number of memory registers. More complex shader paths or instances may be allotted more registers. Another aspect of the invention is directed to a GPU that is configured to allocated memory registers in such a manner.

BRIEF DESCRIPTION OF THE SEVERAL VIEWS OF THE DRAWINGS

The present invention is described in detail below with reference to the attached drawing figures, wherein.

DETAILED DESCRIPTION

Figure 1:
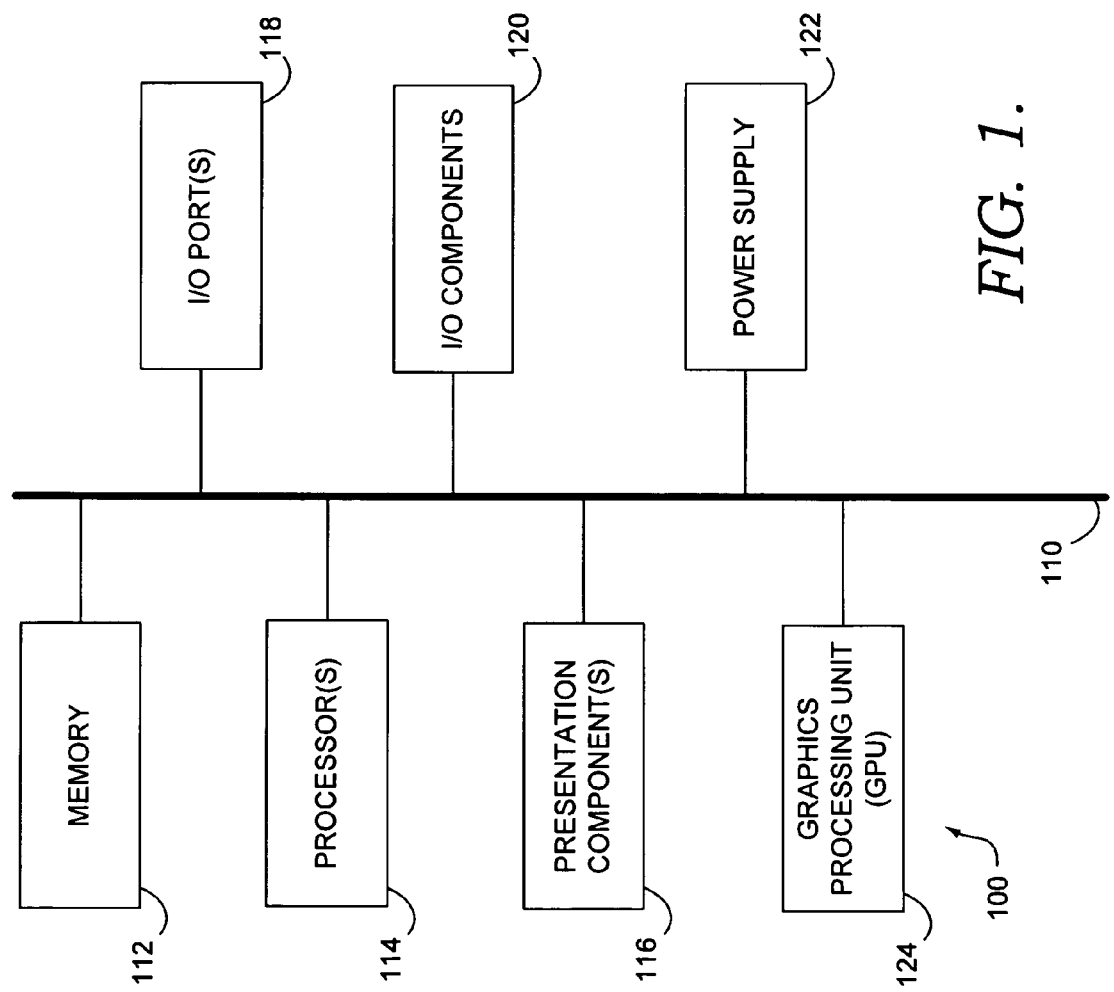
FIG. 1 is a block diagram of an exemplary operating environment for use in implementing an embodiment of the present invention.

The subject matter described herein is presented with specificity to meet statutory requirements. The description herein, however, is not intended to limit the scope of this patent. Rather, it is contemplated that the claimed subject matter might also be embodied in other ways, to include different steps or combinations of steps similar to the ones described in this document, in conjunction with other present or future technologies. Moreover, although the term "block" may be used herein to connote different elements of methods employed, the term should not be interpreted as implying any particular order among or between various steps herein disclosed.

Further, various technical terms are used throughout this description. A definition of such terms can be found in Newton's Telecom Dictionary by H. Newton, $21^{st}$ Edition (2005). These definitions are intended to provide a clearer understanding of the ideas disclosed herein but are not intended to limit the scope of the present invention. The definitions and terms should be interpreted broadly and liberally to the extent allowed the meaning of the words offered in the above-cited reference.

The invention can generally be described as one or more systems for, methods to, and computer-storage media for providing dynamic code linkage to optimally allocate registers for shaders based on their level of complexity. In one embodiment, developers can create their own shader classes and registers are allocated for each shader based on complexity. Simpler shaders are allocated fewer registers, and complex shaders are allocated additional registers.

As one skilled in the art will appreciate, embodiments of the present invention may be embodied as, among other things: a method, system, or computer-program product that is embodied on one or more tangible computer-readable media. Accordingly, the embodiments may take the form of a hardware embodiment, a software embodiment, or an embodiment combining software and hardware.

Dynamic code binding provide a mechanism for abstracting the implementation of a function from the consumers of the function, offered by providing a level of indirection between a function call and implementation. Traditionally, this indirection is performed by first looking into a virtual function table to find the location of the function to execute. When the application is executed, the table which was previously empty is filled with the locations of the function implementations (the actual act of "linking"), therefore allowing the application to actually execute the functions as needed. In one embodiment, a subset dynamic linkage is provided that reduces the number of permutations of specialized shaders while still offering global optimizations across the abstraction boundary.

Instead of providing a single compiled implementation for each abstract function, embodiments generate compiled code in such a way that each use of a specific instance of a shader is compiled as if it was inlined in the code and then stored in a table sorted by function type and call location. It is important to understand that embodiments described herein differ from typical linkage in that at runtime no calling convention is used. Instead, each time a function should be called, a version of the function is emitted to match the call site's register state and other state. Because a new version of the function is emitted for each location in the shader code that the function is called from, all optimizations used when inlining apply, except that the function code must remain functionally separate from main shader code. Because embodiments described herein differ from "real" linkage, the amount of code generated by embodiments described herein can become quite large. No code sharing occurs between multiple call sites. If code is larger than the code cache, and the penalty from the latency of the cache miss is not hidden.

Selectable inlining is used by some of the embodiments described herein. Selectable inlining allows a system to generate a shader instantiation that not is not only close to the optimal instruction usage, but also utilizes the minimum needed registers per invocation for a given task. In this embodiment, the total number of registers needed by a specific shader invocation can be calculated quickly by the device driver and allocated accordingly. This keeps very complex calculations from affecting register usage unless calculations are actually being performed.

In order to maintain optimization, embodiments are configured to emit a different version of each used method per call site, acting as if the method were inline to allow for optimizations across the method-call boundary. This has a trade-off of space and—unlike standard linkage which creates only one compiled version of each method, embodiments described herein create many, potentially causing larger binary files.

Embodiments described herein generally reference the Direct3D APIs included within various versions of the Windows® operating system (OS). Embodiments are not limited to Direct3D APIs. One skilled in the art will understand that various APIs in different OSs provides similar functionality to the calls and routines described herein. For clarity sake, however, reference is made herein to Direct3D.

Before proceeding further, a number of key definitions should be defined. While the below definitions should aid the reader in understanding the embodiments described herein, the definitions are provided merely for explanatory purposes.

A "primitive" is a basic unit for describing a shape. In computer graphics, the triangle is typically considered the fundamental primitive because all possible 2D and 3D shapes can be composed of triangles. As one skilled in the art will appreciate, other shapes may alternatively be used as primitives in rendering graphics.

A "shader" is a small, specialized computer program that performs some aspect of a rendering computation. Shaders are responsible for a number of major aspects in the typical rendering pipeline. These aspects include, inter alia, vertex shading, primitive (or geometry) shading, and pixel shading. One skilled in the art will understand that vertex shading refers to determining the position and orientation of the vertices of a primitive—e.g., where to place the vertices of a triangle in 2D so the triangle appears to be in 3D. Primitive shading describes surface operations for a single primitive. And pixel shading colors each pixel based on a rendered primitive, in order to draw the primitive to the screen.

Shaders may be developed, or programmed, to handle virtually any aspect of a gaming experience. For example, a shader may be written to govern the reflection of light off of a character's skin, based on the color of the character, time, lighting, or other relevant variable. As previously mentioned, some shaders are relatively simple; whereas, others may require more complex computations. Simple shaders may, in some embodiments, require fewer memory registers to process than complex shaders.

A "rasterizer" is a component that takes an image made up of high-order primitives, such as lines, points, and triangles and converts the image into a raster image (i.e., pixels) for output on a video display. A raster image is bitmap representation of the primitives with color. In one embodiment, a rasterizer is software, executed by a GPU, that is configured to color pixels according to primitives produced by shaders.

Direct3D is an application program interface (API) provided within Windows® for rendering 2D and 3D scenes. Direct 3D includes a primitive rasterizer with programmable stages that allows developers within the Windows® platform to load customized programs onto a GPU for rendering. Numerous versions of Direct3D are currently in use, and therefore should be understood by one of skill in the art.

A High Level Shading Language (HLSL) is a variant on a programming language (e.g., C, C++, C#, Java, or the like) designed for developing shaders. Specifically, developers program shaders in HLSL. In operation, HLSL is compiled into an intermediary language (IL) for use with a graphics application.

An IL is a low-level, instruction-based, binary representation of the operations a shader stage should perform. It acts as an intermediate optimization step of the compiler and the native instruction set of the graphics hardware. Thus, the IL translates the instructions designated by a developer by using an HLSL into the byte code necessary by the graphics hardware (i.e., the GPU) in order to render graphics.

Just-in-time (JIT) refers to a fast-process compilation performed on the shader IL to convert the shader into the native instruction set of the graphics hardware. JIT simply refers to the point in time when actions occur in programming and processing. One skilled in the art will understand how JIT compilation works in other programmatic languages, such as Python and C#.

In one embodiment, the present invention takes the form of a computer-program product that includes computer-useable instructions embodied on one or more computer-readable media. Computer-readable media include both volatile and nonvolatile media as well as removable and nonremovable media. By way of example, and not limitation, computer-readable media comprise computer-storage media. Computer-storage media, or machine-readable media, include media implemented in any method or technology for storing information.

Examples of stored information include computer-useable instructions, data structures, program modules, and other data representations. Computer-storage media include, but are not limited to, random access memory (RAM), read-only memory (ROM), electrically erasable programmable read-only memory (EEPROM), flash memory used independently from or in conjunction with different storage media, such as, for example, compact-disc read-only memory (CD-ROM), digital versatile discs (DVD), holographic media or other optical disc storage, magnetic cassettes, magnetic tape, magnetic disk storage, or other magnetic storage devices. These memory components can store data momentarily, temporarily, or permanently.

Having briefly described a general overview of the embodiments described herein, an exemplary computing device is described below. Referring initially to FIG. 1 in particular, an exemplary operating environment for implementing the present invention is shown and designated generally as computing device 100. Computing device 100 is but one example of a suitable computing environment and is not intended to suggest any limitation as to the scope of use or functionality of the invention. Neither should computing device 100 be interpreted as having any dependency or requirement relating to any one or combination of components illustrated. In one embodiment, computing device 100 is a conventional computer (e.g., a personal computer or laptop).

One embodiment of the invention may be described in the general context of computer code or machine-useable instructions, including computer-executable instructions such as program modules, being executed by a computer or other machine. Generally, program modules including routines, programs, objects, components, data structures, and the like refer to code that perform particular tasks or implement particular abstract data types. Embodiments described herein may be practiced in a variety of system configurations, including hand-held devices, consumer electronics, general-purpose computers, more specialty computing devices, etc. Embodiments described herein may also be practiced in distributed computing environments where tasks are performed by remote-processing devices that are linked through a communications network.

With continued reference to FIG. 1, computing device 100 includes a bus 110 that directly or indirectly couples the following devices: memory 112, one or more processors 114, one or more presentation components 116, input/output ports 118, input/output components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be gray and fuzzy. For example, one may consider a presentation component such as a display device to be an I/O component. Also, processors have memory. It will be understood by those skilled in the art that such is the nature of the art, and, as previously mentioned, the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

Computing device 100 typically includes a variety of computer-readable media. By way of example, and not limitation, computer-readable media may comprise RAM; ROM; EEPROM; flash memory or other memory technologies; CDROM, DVD or other optical or holographic media; magnetic cassettes, magnetic tape, magnetic disk storage or other magnetic storage devices, or similar tangible media that configurable to store data and/or instructions relevant to the embodiments described herein.

Memory 112 includes computer-storage media in the form of volatile and/or nonvolatile memory. The memory may be removable, nonremovable, or a combination thereof. Exemplary hardware devices include solid-state memory, hard drives, cache, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc.

I/O ports 118 allow computing device 100 to be logically coupled to other devices including I/O components 120, some of which may be built in. Illustrative components include a microphone, joystick, game pad, satellite dish, scanner, printer, wireless device, etc.

Computing device 100 also includes a GPU 124 capable of simultaneously processing multiple shaders in parallel threads. To do so, the GPU 124 may be equipped with various device drivers and, in actuality, comprise multiple processors.

Figure 2:
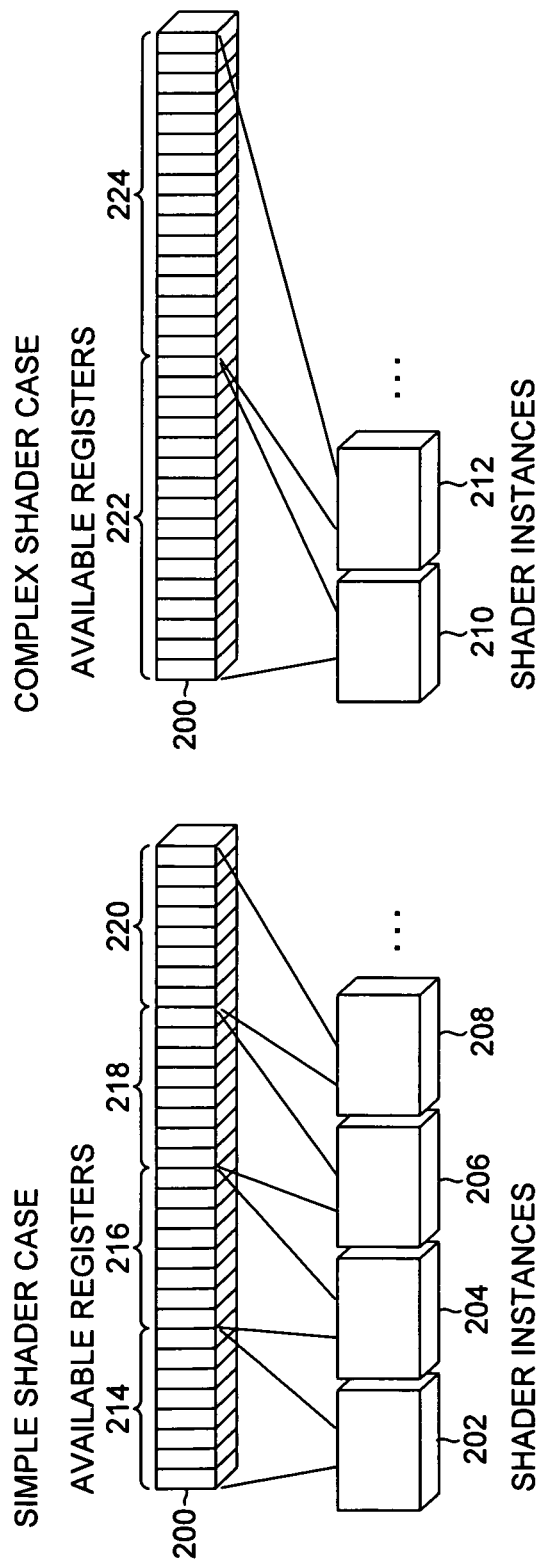
FIG. 2 is a diagram illustrating the allocation of memory registers of a computing device in accordance with an embodiment of the invention.

FIG. 2 is a diagram illustrating the allocation of memory registers of a computing device in accordance with an embodiment of the invention. As shown in FIG. 2, a plethora of memory registers 200 are available on the computing device. The same block of registers 200 is presented side-by-side to illustrate how the memory is allocated for either simple shader instances 202, 204, 206, and 208 and complex shader instances 210 and 212. Instances may include either programmatic representations of the shaders or bytecode renditions of the shaders. Moreover, the allocation of registers 200 may be performed by a GPU or CPU on the computing device.

Simple registers 202, 204, 206, and 208 are allocated to available blocks 214, 216, 218, and 220. Complex shaders are allocated to available blocks 222 and 224. Available blocks allocated to simple shaders (i.e., blocks 214, 216, 218, and 220) contain fewer registers than the available blocks allocated to complex shaders (i.e., blocks 222 and 224).

In one embodiment, the blocks of registers are allocated in code by designating two separate shaders for scenarios (simple and complex) and loading the appropriate scenario whenever necessary. To do so, pointers may be set for a given shader.

Figure 3:
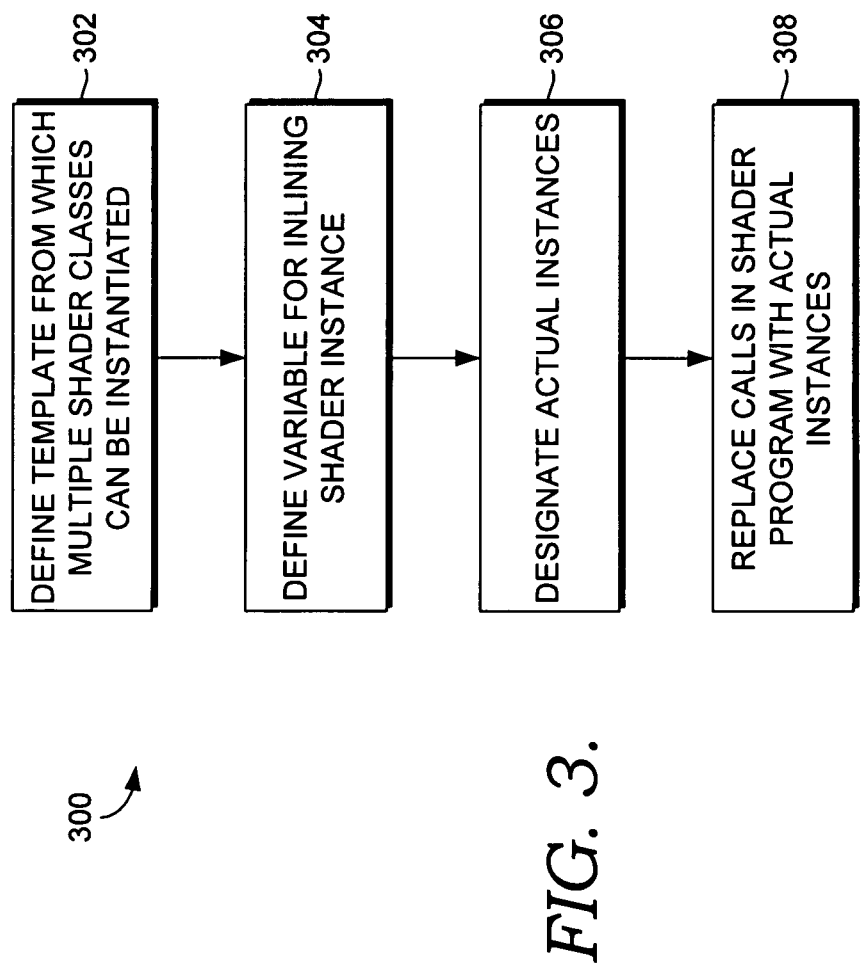
FIG. 3 is a diagram of flow chart for allocating registers based on shader complexity in accordance with an embodiment of the invention.

FIG. 3 is a diagram of flow chart for allocating registers based on shader complexity in accordance with an embodiment of the invention. Initially, interfaces are declared in HLSL defining a template from which multiple shader classes can be instantiated, as indicated at 302. A variable for inlining a shader implementation is also defined in a shader program, as indicated at 304. In one embodiment, a shader implementation is a routine or sub-routine. Actual instances are designated, as indicated at 306, by pointing to a table storing data about the shader implementation. And method calls in the shader program are replaced with the actual class instances (routines or sub-routines), as indicated at 308. To illustrate the aforesaid steps, code that can integrate with Direct3D is presented below and discussed in detail.

Direct3D contains a number of discreet shader stages, each meant for a separate purpose in the rendering pipeline. These six stages create a rendering pipeline where the developer writes code to control the operation of each shade or stage. To target these stages, the developer uses an HLSL and the associated HLSL compiler, which converts HLSL code into optimized shader byte code. As previously mentioned, byte code is a low-level representation of compiled HLSL code for use a graphics device driver in the graphics hardware.

In one embodiment, HLSL contains object-oriented constructs that allow for the grouping of functions and independent resources like variables and textures into classes. In this paradigm, interfaces can be declared to define a template from which multiple classes can be instantiated. When defined in this way, the classes that inherit from an interface define the implementations that are to be linked using dynamic linkage. In order to define a point in a shader program into which one of the implementations can be inserted, the developer creates an interface variable and the defined methods of that interface can be used without reference to the possible class inferences. In one embodiment, a single shader implementation is selected and built into the shader. In an alternative embodiment, a particular point in the HLSL code where an interface is used defines a place where all implementations are inline, and all implementation bodies are inserted into the shader. Then, when the shader is actually running, long after compilation, a particular implementation is chosen to execute.

The following code shows how an actual class instance can be selected and method calls replaced with shader code.

```
1   interface Light
2   {
3       float3 Calculate(float3 Position, float3 Normal);
4   }
5
6   class AmbientLight : Light
7   {
8       float3 Calculate(float3 Position, float3 Normal)
9       {
10          return AmbientValue;
11      }
12
13      float3 AmbientValue;
14  }
15
16  class DirectionalLight : Light
17  {
18      float3 Calculate(float3 Position, float3 Normal)
19      {
20          float3 LightDir = normalize(Position – LightPosition);
21          float LightContrib = saturate( dot( Normal, –LightDir) );
22          return LightColor * LightContrib;
23      }
24
25      float3 LightPosition;
26      float3 LightColor;
27  }
28
29  AmbientLight MyAmbient;
30  DirectionalLight MyDirectional;
31
32  float4 main (Light MyInstance, float3 CurPos: CurPosition,
33          float3 Normal : Normal) : SV_Target
34  {
35      float4 Ret;
36      Ret.xyz = MyInstance.Calculate(CurPos, Normal);
37      Ret.w = 1.0;
38
39      return Ret;
40  }
```

The above example is written in HLSL, and the actual representation of bytecode is in binary. An explanation of the above code is presented in the following paragraphs.

Lines 1-4 define an interface called Light, which is the parent interface of classes defined in the example. In line 3, a prototype for the Calculate method is defined. Calculate must be implemented by any subclass of Light. Lines 6-14 define AmbientLight, which is a simple implementation of the Light interface (i.e., a simple shader definition). Lines 18-23 show an implementation of the Calculate method with a signature that is identical to Light::Calculate but with code more complex than DirectionalLight::Calculate (i.e., a complex shader definition).

Lines 25-26 show depict local class variables needed for the operation of DirectionalLight. Lines 29-30 show class instance definitions for a two variables: MyAmbient (a simple shader definition) and MyDirectional (a complex shader definition). These variables act as binding points to a rendering pipeline and identify the possible implementations that can be selected for use in the MyInstance variable's place described below.

Lines 32-40 show the main shader portion of the program. The first argument is a generic interface variable of type Light. At the point that Light is used, a special invocation instruction is inserted (in one embodiment). As a result, all implementation bodies will appear in the shader bytecode. Tables may then link the invocation to the bodies it might execute. The remaining parameters are standard rendering pipeline variables used in a standard Direct3D shader.

In operation, the above code may be written in HLSL code and sent to an HLSL compiler for conversion into bytecode. The bytecode will, in turn, be provided to a driver on the GPU to be set as the program for the shader stage described in the HLSL code. In previous versions of Direct3D, this bytecode consisted of a low-level description of the inputs, outputs, and dependent resources needed by the shader and assembly-style instructions that define the operation of the shader stage. With respect to embodiments described herein, the Direct3D bytecode further includes of sub-routines that define inputs, outputs, and operational instructions for the sub-routine and tables that define the usage points of abstract interface methods and which of the method definitions can be inlined into various points in the shader. It is important to note that the example below is written in semi-readable text called disassembly, and the actual representation of bytecode is in binary.

The bytecode is meant to represent a highly optimized, expressive definition of the state and expected execution of the shader stage. In versions of Direct3D prior to Direct3D 10, this bytecode matched the exact instructions that could be executed on the graphics hardware. Because of divergent architectures in Direct3D 10 (e.g., pipeline emulation on the CPU), the bytecode was revised to instead provide an intermediate representation—the IL. In one embodiment, device drivers for a GPU are provided the IL and convert the code to the proper native instructions in a JIT process. In another embodiment, the IL is designed in such a way that the JIT operation can be performed with minimal need for optimization or reformatting. Additionally, separate class instances may have the JIT operation performed on them at the creation of the shader definition—rather than when linkage occurs—in order to assure that at link time, the linkage can be performed as a trivial inline. The aforesaid can be seen in the exemplary code below. It should be noted that the code presented below is not meant to limit embodiments of the present invention. Other code may alternatively be used.

```
1   dcl_func_table ft0 { fb0 }
2
3   dcl_func_table ft1 { fb1 }
4
5   dcl_func_ptr fp0[1][1] = { ft0, ft1 };
6
7   fb0: in:(const iv0.xyzw,
8        const iv1.xyzw,
9        const iv2.xyzw),
10       out:(oo0.xyzw)
11  mov oo0, cb[iv0.x][iv0.y]
12  ret
13
14  fb1: in:(const iv0.xyzw,
15       const iv1.xyzw,
16       const iv2.xyzw),
17       out:(oo0.xyzw)
18  add r0.xyz, iv1.xyzx, -cb[iv0.x][iv0.y].xyzx
19  dp3 r0.w, r0.xyzx, r0.xyzx
20  rsq r0.w, r0.w
21  mul r0.xyz, r0.xyzx, r0.wwww
22  dp3_sat r0.x, iv2.xyzx, -r0.xyzx
23  mul oo0.xyz, r0.xxx, cb[iv0.x][iv0.y+1].xyz
24  ret
25
26  main:
27  fcall fp0[0][0], in:(cb14[0], v0, v1), out:(oo0)
28  ret
```

Line 1 depicts a class instance table for AmbientLight and lists all function implementations for a specific class instance. In the above code, there is only one function, Calculate, which is called once in the main shader code. Therefore, only one implementation exists, fb0. Additional methods, functions, routines, or calls to existing methods in the class AmbientLight could be referenced as well. Furthermore, line 3 shows a class instance table for the variable DirectionalLight discussed in reference to the previous code.

The table interface used to dispatch via MyInstance is on line 5. The first array dimension indicates if the interface variable is an array. In this case there is only one element, so the dimension is given a value of 1. The second array dimension is the number of call sites for the interface. In this case there is only one method, Calculate, so the dimension is one. Finally, the list in braces is the list of class instance tables that can be used by this interface variable. Since both ft0 (AmbientLight) and ft1 (DirectionalLight) inherit from Light, these are the two tables that are listed.

Lines 7-12 show IL for AmbientLight's implementation of Calculate, optimized for the call site at line 27. If there were additional call sites that used the Calculate function for the AmbientLight class, there would be multiple blocks like this one optimized for the specific call site. Note that registers labeled as "iv" and "ov" are used instead of standard HLSL registers like x, s, or cb. If multiple call sites emit the same set of instructions, the redundant blocks can be removed and the various call sites will point to a single block. This means that the call site enumerates the registers, requiring that a substitution of registers needs to occur as part of the inlining process. Additionally, lines 14-24 show IL for DirectionalLight's implementation of Calculate, optimized for the call site at line 27.

The main shader code block is presented in lines 26-28. In 27, an Fcall instruction indicates an array element and defines the call site for the Calculate routine for a variable, MyMaterial. The first parameter indicates the interface table that is to be used (fp0). The first bracketed index defines the method index. In this case, there is only one call site so the index is one. The second bracketed index defines the index of the call site being executed. In this case there is only one invocation of the Calculate method, so this index is zero. "in" and "out" indicate the registers that are utilized by this call. The first "in" parameter always refers to the place in constant memory that the class instance variables are stored—this case cb14, element zero.

In one embodiment, the fcall instruction refers to the method to be called by providing an index, but does not define the exact implementation to call. When generating the IL and then later the native hardware instructions for program execution, code is emitted up to the fcall routine and the current state of the registers and other shader states are partially cached and restored around implementation generation. The code for the first implementation is generated starting with the current state of register allocation, scratch registers, etc. Once this generation step is complete, the state is restored to the cached state, and the generation is repeated for the next possible implementation is compiled. This cycle repeats until all implementations have code generated. Finally the current state is restored the cached state and the impacts of the outputs of the fcall are applied to the current state, and code generation continues after the fcall. The resulting methods generated are defined in the IL and referenced in class instance tables, which match the structure of the interface definitions and have reference to each compiled function version created.

To implement the above in a C API, minimal changes are made to Direct3D. In one embodiment, a new API is added for referencing the class instances provided by a shader. Additionally, another API is created to reference a class instance.

In operation, when this shader object is bound to the pipeline, the application has the opportunity to provide a listing of the specific class instances it wishes to utilize for the available bind points in the shader. To do so, a list objects is obtained by providing the names of the HLSL class instances for the shader to the API that references class instances.

The class-referencing API may only allow interaction in a batched mechanism, meaning that the application can only change the state of the rendering pipeline between sets of draw calls rather than more granularly, like between the rendering of pixels. Yet, some embodiments may change states in between sets of primitives, making the class instances only changeable between batches of primitives. This can be seen in the following code.

```
1  pDevice->CreatePixelShader(pShaderCode,
     pMyClassLibrary, &pMyPS);
2
3  pMyDirectionalLight =
     pMyClassLibrary->GetClassInstance("MyDirectional");
4  pMyAmbientLight =
     pMyClassLibrary->GetClassInstance("MyAmbient");
5
6  while (true)
7  {
8    if (DirectionalLighting)
9        pDevice->PSSetShader(pMyPS, &pMyDirectionalLight, 1);
10   else
11       pDevice->PSSetShader(pMyPS, &pMyAmbientLight, 1);
12
13   RenderScene( );
14 }
```

Line 1 illustrates a routine, CreatePixelShader, that is provided a string parameter that contains the compiled shader bytecode in pShaderCode, a pointer to an API that references class instances (pMyClassLibrary), and a pointer to a pointer to a pixel shader (pMyPS). The routine examines the bytecode and populates pMyClassLibrary with information on what interfaces and class instances are available in the shader. Additionally, the bytecode is also provided to a device driver of a GPU, which performs a JIT conversion of the code to a native representation and stores the converted code internally. Finally a reference is returned to the shader in pMyPS for later API use.

In line 3, a pointer (pMyDirectionalLight) to the API that references class instances is set to reference the MyDirectional class instance in the shader. In line 4, a pointer (pMyAmbientLight) to the API that references class instances is set to reference the MyAmbient class instance in the shader. Lines 6-14 depict a loop that will render the scene repeatedly until the program exits.

Line 8 shows code for selecting what call instance to use based on the global input DirectionalLighting. Based on the selection made in line 8, a call is made with the shader object in pMyPS along with one of the two possible class instances that can be applied to the HLSL variable MyInstance. The final argument indicates the length of the array provided in the second argument as there might be more than one interface to resolve in any one shader. Finally, a call is show in line 13 to a function for rendering the geometry of a scene.

Although the subject matter has been described in language specific to structural features and methodological acts, it is to be understood that the subject matter defined in the appended claims is not necessarily limited to the specific features or acts described above. Rather, the specific features and acts described above are disclosed as example forms of implementing the claims. For example, sampling rates and sampling periods other than those described herein may also be captured by the breadth of the claims.

The invention claimed is:

1. One or more computer-storage memory devices having computer-executable instructions embodied thereon for executing a method allocating memory registers to shader instances, the method comprising:
   declaring one or more interfaces to define a shader template, wherein one or more classes of a shader depend from the one or more interfaces;
   defining a simple shader definition and a complex shader definition;
   defining a variable in a shader program for inlining an actual shader instance;
   at a point in the shader program where the one or more interfaces are used, inlining instances of the simple shader definition and the complex shader definition;
   providing a graphics processing unit (GPU) driver with one or more tables defining usage points and indicating definitions of the simple shader definition and the complex shader definition;
   upon execution, choosing a shader instance, the shader instance being either a simple shader instance of the simple shader definition or a complex shader instance of the complex shader definition;
   allocating memory for the shader instance, wherein a number of registers associated with the memory and allocated for the shader instance depends on a level of complexity for the shader instance; and
   binding the simple shader instance and complex shader instance to a pipeline, wherein binding comprises storing in a table by a function type and a call location each use of both the simple shader instance and the complex shader instance, wherein a new version of the function is emitted for each location in the a shader code associated with at least one of the simple shader instance or the complex shader instance that the function is called from.

2. The memory of claim 1, further comprising:
   translating the shader instance into bytecode; and
   rasterizing pixels on a computing device based on the bytecode.

3. The memory of claim 2, wherein the shader instance is compiled into bytecode by a high level shading language (HLSL) compiler.

4. The memory of claim 1, wherein the shader instance is programmed in a high level shading language (HLSL).

5. The memory of claim 1, wherein the shader instance is used to determine an operation in a three-dimensional (3D) graphic.

6. The memory of claim 1, further comprising:
   providing compiled shader bytecode;
   providing a pointer to an application program interface;
   providing a pointer to a pixel-shading shader;
   providing the shader bytecode to a device driver for a graphics processing unit (GPU); and
   returning a reference to the shader instance.

7. The memory of claim 6, further comprising:
   referencing the one or more classes of the shader;
   storing the one or more classes in a memory location; and
   designating a pointer to the memory location.

8. The memory of claim 1, wherein the pipeline simultaneously executes numerous shader instances in parallel.

9. The memory of claim 1, wherein replacing a call in the shader program further comprises:
   receiving one of two or more shader instances of the shader; and
   replacing the call in the shader program with the one of two or more shader instances of the shader.

10. A method for processing one or more shaders on a computing device, comprising:

declaring one or more interfaces to define a shader template, wherein one or more classes of a shader depend from the one or more interfaces;
defining a variable in a shader program for inlining an actual shader instance;
accessing a pointer to an application program interface (API) that references instances of a simple shader definition and a complex shader definition;
providing a graphics processing unit (GPU) driver with one or more tables defining usage points and indicating definitions of the simple shader definition and the complex shader definition;
linking the actual shader instance to both a simple shader definition and a complex shader definition;
upon execution, invoking one of the simple shader definition or the complex shader definition;
allocating memory for the actual shader instance, wherein a number of the one or more registers associated with the memory and allocated for the actual shader instance depends on a level of complexity for the shader instance, and
binding a simple shader instance of the simple shader definition and complex shader instance of the complex shader definition to a pipeline, wherein binding comprises storing in a table by a function type and a call location each use of both the simple shader instance and the complex shader instance, wherein a new version of the function is emitted for each location in the a shader code associated with at least one of the simple shader instance or the complex shader instance that the function is called from.

11. The method of claim 10, further comprising:
providing compiled shader bytecode;
providing a pointer to an application program interface;
providing a pointer to a pixel-shading shader;
providing the shader bytecode to a device driver for a graphics processing unit (GPU); and
returning a reference to the shader instance.

12. The method of claim 10, wherein the shader instance is used to determine an operation in a three-dimensional (3D) graphic.

13. A computing device configured to render likenesses of three-dimensional graphics in two-dimensions, comprising:
a memory unit with one or more memory registers; and
a graphics processing unit (GPU) configured to allocate the one or more memory registers associated with the shader based on a previously defined shader class, wherein the GPU is configured to:
(1) declare one or more interfaces to define a shader template,
(2) define a variable in a shader program for inlining multiple definitions of an actual shader instance,
(3) replace a call in the shader program with one of the definitions of the actual shader instance,
(4) populate a class instance table with information about a simple shader instance and a complex shader instance,
(5) allocate memory for the shader instance, wherein a number of the one or more registers associated with the memory and allocated for the shader instance depends on a level of complexity for the shader instance, and
(6) binding the simple shader instance and complex shader instance to a pipeline, wherein binding comprises storing in a table by a function type and a call location each use of both the simple shader instance and the complex shader instance, wherein a new version of the function is emitted for each location in the a shader code associated with at least one of the simple shader instance or the complex shader instance that the function is called from.

14. The computing device of claim 13, wherein
the one or more classes of a shader depend from the one or more interfaces.

15. The computing device of claim 14, wherein the actual shader instance determines the position of one or more primitives.

16. The computing device of claim 13, wherein the GPU executes a rasterizer for coloring pixels based on the actual shader instance.

* * * * *